United States Patent
Morishita et al.

(10) Patent No.: US 9,644,754 B2
(45) Date of Patent: May 9, 2017

(54) VALVE STRUCTURE

(71) Applicant: TECHNO TAKATSUKI CO., LTD., Osaka (JP)

(72) Inventors: Tomoyuki Morishita, Osaka (JP); Nozomu Kawasaki, Osaka (JP)

(73) Assignee: TECHNO TAKATSUKI CO., LTD. (JP)

( * ) Notice: Subject to any disclaimer, the term of this patent is extended or adjusted under 35 U.S.C. 154(b) by 0 days.

(21) Appl. No.: 14/456,034

(22) Filed: Aug. 11, 2014

(65) Prior Publication Data

US 2015/0041006 A1    Feb. 12, 2015

(30) Foreign Application Priority Data

Aug. 12, 2013 (JP) ................................. 2013-167788
Jul. 24, 2014 (JP) ................................. 2014-150953

(51) Int. Cl.
F16K 11/22     (2006.01)
F16K 11/07     (2006.01)
F16K 31/524    (2006.01)

(52) U.S. Cl.
CPC ......... *F16K 11/0716* (2013.01); *F16K 11/22* (2013.01); *F16K 31/52416* (2013.01); *Y10T 137/85986* (2015.04); *Y10T 137/86501* (2015.04)

(58) Field of Classification Search
USPC ......... 251/259, 260, 262, 263; 137/867, 868
See application file for complete search history.

(56) References Cited

U.S. PATENT DOCUMENTS 2,291,564 A * 7/1942 Scott ................. B23P 11/005
                                                    123/198 R
2,297,576 A * 9/1942 Miller ................. F16K 11/22
                                                    137/868

(Continued)

FOREIGN PATENT DOCUMENTS

EP    1319879        6/2003
JP    2001193663     7/2001
JP    2002250455     9/2002

OTHER PUBLICATIONS

Eurpoean Search Report, European Application No. 14180001, dated Jan. 26, 2015.

*Primary Examiner* — John Fox
(74) *Attorney, Agent, or Firm* — Perman & Green, LLP

(57) ABSTRACT

There is provided a valve structure including a valve case provided with a suction port and discharge ports, valve bodies provided for opening and closing the discharge ports and a drive body for driving the valve bodies, where the valve bodies are provided with, at one end thereof, a blocking portion for closing the discharge port and at the other end thereof, an elastic member portion generating an elastic force for moving the blocking portion for opening and closing the discharge port, the rod-like drive body having a convex portion on its side is inserted into through-holes provided on the valve bodies in a direction intersecting a moving direction of the blocking portion moved by an elastic force, and the blocking portion is moved in the direction intersecting the drive body by the rotation of the drive body, thereby controlling the opening and closing of the discharge port.

9 Claims, 17 Drawing Sheets

(56) References Cited

U.S. PATENT DOCUMENTS

| | | | | |
|---|---|---|---|---|
| 2,533,652 | A * | 12/1950 | Weiffenbach | F16K 1/00 251/155 |
| 3,680,830 | A * | 8/1972 | Low | F16K 31/52408 251/331 |
| 3,756,559 | A * | 9/1973 | Boggs | F16K 41/10 251/335.3 |
| 4,804,164 | A * | 2/1989 | Nakazawa | F16K 31/56 138/46 |
| 4,846,138 | A | 7/1989 | Vallejos | |
| 6,247,493 | B1 * | 6/2001 | Henderson | G05D 7/0641 137/12 |
| 6,454,243 | B2 * | 9/2002 | Kawolics | F16K 41/103 251/262 |

\* cited by examiner

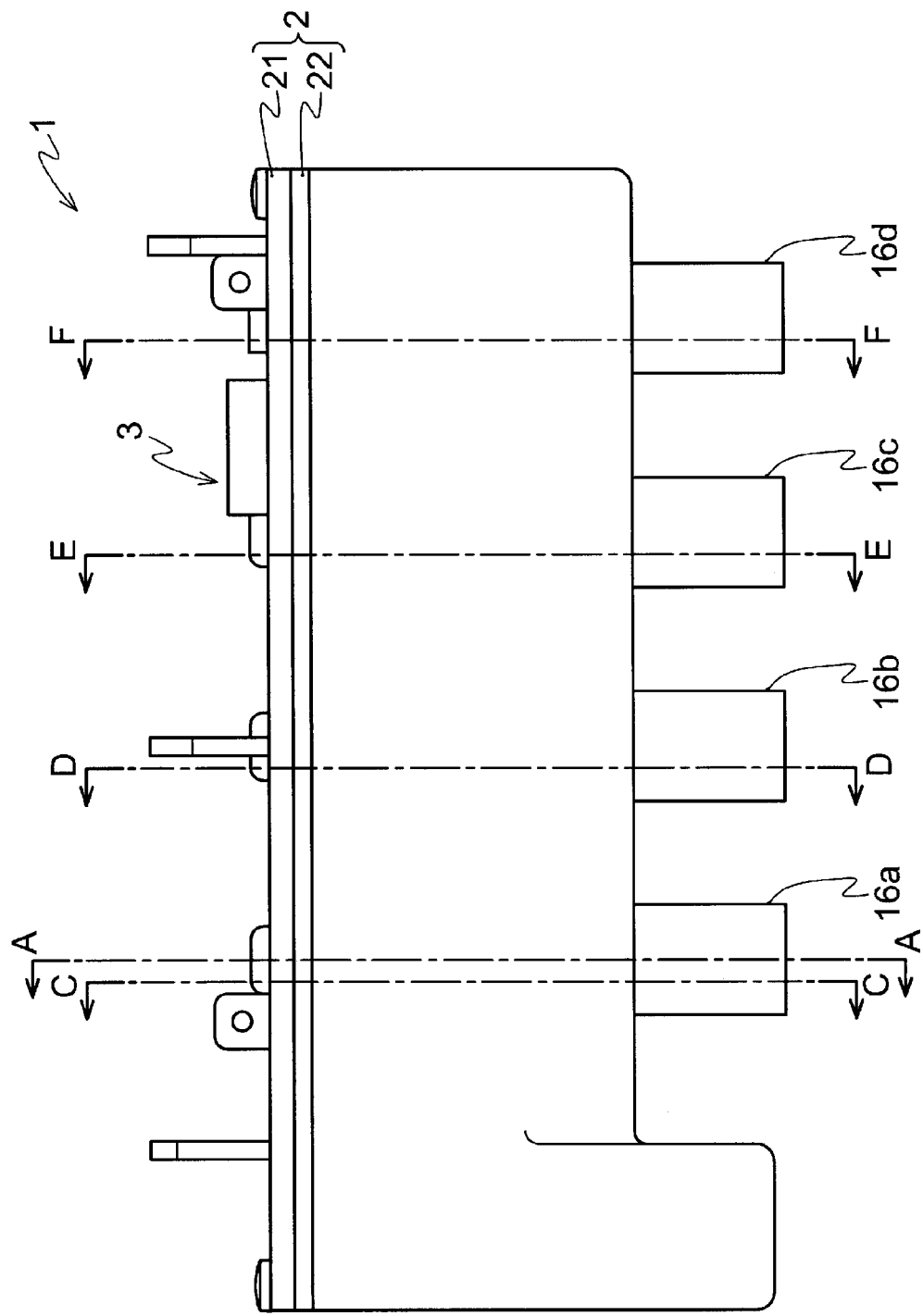

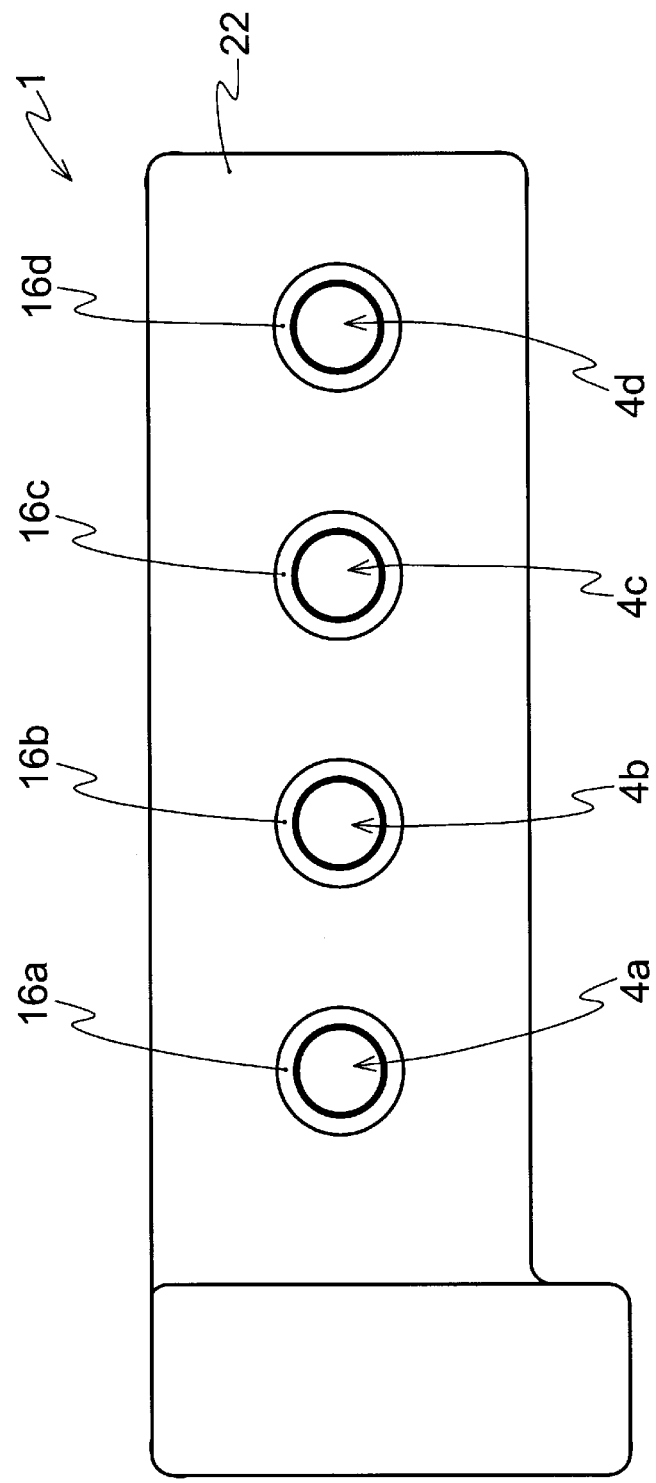

VALVE STRUCTURE

CROSS-REFERENCE TO RELATED APPLICATIONS

This application claims priority to and the benefit of Japanese Patent Application No. 2014-150953, file on Jul. 24, 2014 and Japanese Patent Application No. 2013-167788, filed on Aug. 12, 2013, the disclosures of which are incorporated herein by reference in their entireties.

FIELD

The presently disclosed embodiment relates to a valve structure for opening and closing a discharge port through which a fluid fed from a pump or the like is discharged, in particular to a valve structure for opening and closing a discharge port by moving a valve body for opening and closing the discharge port in a direction intersecting a drive body by an elastic force of an elastic body and a rotational motion of the drive body, for example, a valve structure in which the elastic body such as spring and the valve body can be integrally formed and which can be used for feeding air into an indoor air mat and a bedsore preventing mat or feeding oxygen into a water tank for aquarium fishes and a septic tank.

BACKGROUND

In order to distribute air supplied from an air pump or the like into a plurality of pipes, for example, a configuration so as to open or close two discharge ports 104a and 104b by subjecting a movable valve 121 connected to a spring 108 and an electromagnetic device 120 such as a solenoid via a piston rod 126 to reciprocating motion by a biasing action of the spring 108 and a driving force of the electromagnetic device 120 has been considered as shown in FIG. 12. Namely, in FIG. 12, when an electric current is not fed to the electromagnetic device 120, the movable valve 121 is drawn toward the right side in FIG. 12 due to the biasing action of the spring 108 to close the discharge port 104a, and as a result, the air supplied from an air pump or the like and flowing into an air chamber 123 at the suction side passes through the discharge port 104b and is discharged into a discharge pipe 124b. On the other hand, when an electric current is fed to the electromagnetic device 120, the movable valve 121 is moved toward the left side in FIG. 12 due to the driving force of the electromagnetic device 120 resisting the biasing action of the spring 108 to close the discharge port 104b, and the air supplied from an air pump or the like passes through the discharge port 104a and is discharged into a discharge pipe 124a Further, as shown in FIGS. 13A and 13B and FIGS. 14A-14C, it has been considered that a piston rod 226 on which a plurality of movable valves 221a-221e are mounted apart from each other is inserted into a cylinder 225 provided with a suction portion 223 and a plurality of discharge portions 222a-222c, and by a reciprocating motion of this piston rod 226 in the cylinder 225 by means of a drive source 214, the suction portion 223 is communicated with any of the discharge portions 222a-222c via a space partitioned by the movable valves 221a-221e in the cylinder 225 FIGS. 13A and 13B represents the case of providing two discharge portions 222a and 222b and FIGS. 14A-14C represents the case of providing three discharge portions 222a-222c. In FIGS. 14A-14C, the suction portion 223 is connected to the cylinder 225 via a branching port 228a or 228b. In the state shown in FIG. 13A, air supplied from an air pump or the like and flowing into the suction portion 223 passes through the space at the left side of the movable valve 221a in the cylinder 225 and is discharged into the discharge portion 222a, and on the other hand, as shown in FIG. 13B, when the piston rod 226 is moved until the movable valve 221a is located at the left side of an opening 223a of the suction portion 223, the air passes through the space between the movable valve 221a and the movable valve 221b in the cylinder 225 and is discharged into the discharge portion 222b. In the state shown in FIG. 14A, the air supplied from an air pump or the like and flowing into the suction portion 223 passes through the branch port 228a and the space between the movable valve 221b and the movable valve 221c in the cylinder 225 and is discharged into the discharge portion 222a, and in FIG. 14A, when the piston rod 226 is moved toward the right direction, as shown in FIGS. 14B and 14C, the discharge portion communicating with the suction portion 223 is changed from the discharge portion 222a to the discharge portion 222b, further to the discharge portion 222c in order according to the positions of the movable valves 221a-221e, and the air supplied from an air pump or the like is discharged into any of the discharge portions 222a-222c communicating with the suction portion 223.

In the conventional configuration shown in FIG. 12, its structure is such that the movable valve 121 undergoes reciprocating motion by the electromagnetic device 120 and the spring 108, and the both of the two discharge ports 104a and 104b are closed by this one movable valve 121. Therefore, the movable valve 121 and the spring 108 biasing the movable valve 121 for closing any of the discharge ports (the discharge port 104a in FIG. 12) have to be disposed with a partition wall having the discharge port being provided between them, and the movable valve 121 and the spring 108, after having been formed separately, are to be assembled via the discharge port, which leads to a problem that the production becomes complicated. Further, since the spring 108 and the movable valve 121 have to be formed separately, cost reduction by integrally forming the both to decrease the number of parts and simplify production steps cannot be achieved.

Meanwhile, in the case of a structure where the movable valve 121 is provided on each of the discharge ports 104a and 104b, though it is possible to provide the spring 108 and the movable valve 121 together on one side of a partition wall, two drive sources such as expensive electromagnetic devices 120 are needed, which leads to a problem of increase in cost. Further, if the number of branches is increased, additional electromagnetic devices 120 are needed accordingly.

Further, in the structures shown in FIGS. 13A and 13B and FIGS. 14A-14C, since in the cylinder 225, a connecting position of the suction portion 223 with respect to connecting positions of the discharge portions 222 is limited, there may be a case where a flow path between the joint of the suction portion 223 or the discharge portion 222 with the outside flow path and the given connecting position in the cylinder 225 is needed, and this may result in increase of cost and increase of a size of the branched portion. In addition, if the number of branches is three or more, as shown in FIGS. 14A-14C, branch ports 228a and 228b are needed, and also in this case, there is a problem that cost increases and a size of the branched portion increases.

The presently disclosed embodiment was made in light of the above-mentioned situation, and the object of the presently disclosed embodiment is to provide a valve structure enabling opening and closing of discharge ports to be controlled by driving two or more valve bodies with one drive source, thus minimizing increase in cost and size resulting from increase in the number of branches.

SUMMARY

A valve structure of the presently disclosed embodiment comprises a valve case provided with a suction port into which a fluid flows and discharge ports from which the fluid flows out, valve bodies provided for opening and closing the discharge ports and a drive body provided for driving the valve bodies, wherein the valve bodies are provided with, at one end thereof, a blocking portion disposed so as to face the discharge port for closing the discharge port and at the other end thereof, an elastic member portion which is supported on an inner wall of the valve case facing the discharge port and generates an elastic force for moving the blocking portion so as to open or close the discharge port and the valve body is further provided with a through-hole penetrating the valve body in the direction intersecting the moving direction of the blocking portion moved by the elastic force; the drive body is formed into a rod-like shape having convex portions on its side and is inserted into the through-hole of the valve body; and each of the convex portions is pressed onto the valve body by the rotation of the drive body, thereby moving the blocking portion in the direction intersecting the drive body to control the opening and closing of the discharge port.

Here, the convex portion means a portion protruding outward on the side of the drive body formed in the rod-like shape, and includes both of a protruded portion integrally formed with the drive body and a protruded portion formed separately from the drive body and then mounted on the drive body.

It is preferable that the valve body is provided with the blocking portion and the elastic member portion which are formed integrally since the number of parts can be decreased and the production steps can be simplified, thereby reducing cost.

The elastic member portion is configured so as to generate an elastic force for moving the blocking portion to close the discharge port, and the blocking portion may be configured so as to separate from the discharge port by pressing the convex portion onto the valve body, thereby opening the discharge port.

The valve structure may be configured such that a wall surface at least having a portion facing toward the same direction as the moving direction of the blocking portion moved by the elastic force or facing toward a direction at a sharp angle to the moving direction is formed on a part of the valve body, and a plate cam in the form of a plate has a top portion protruding on its outer periphery and the top portion is provided as the convex portion of the drive body and is pressed onto the wall surface at a predetermined rotation angle of the drive body.

The elastic member portion may be configured such that it includes a pair of plate springs having a cross-section in the doglegged form, and the ends of the pair of plate springs opposite the blocking portion is supported on the inner wall of the valve case.

The elastic member portion may be configured such that it includes a coil spring, and one end of the coil spring is supported on the inner wall of the valve case and the other end of the coil spring is supported on the other end side of the valve body.

According to the presently disclosed embodiment, the valve structure is so configured that the valve body is moved in the direction intersecting the drive body by the rotation of the drive body inserted into the through-hole provided on the valve body, thereby controlling the opening and closing of the discharge port, and therefore, when one drive body is inserted into the through-holes of a plurality of valve bodies, only by rotating the drive body, for example, the plurality of discharge ports arranged in the direction along the drive body can be opened and closed. Accordingly, only with one driving source and yet a driving source such as a relatively inexpensive motor without using an expensive electromagnetic device, the plurality of discharge ports can be brought to a closed or opened state. Thus, since no separate driving sources are needed for each of the valve bodies, when comparing a cost for the case of providing valve bodies for the respective discharge ports, the cost can be reduced as compared with a prior art.

Similarly even in the case of a number of branches, a branched structure can be configured according to the number of branches by increasing only the number of valve bodies and convex portions to be provided on the drive body without providing the same number of driving sources as the number of branches or without providing branched ports at the suction side, thereby enabling the number of branches to be increased while inhibiting increase in cost and size.

Further, according to the presently disclosed embodiment, the blocking portion for closing the discharge port and the elastic member portion, for example, a spring for generating an elastic force and thereby moving the blocking portion are provided on the valve body, and therefore, it is not necessary to assemble the both via the discharge port, and production can be carried out easily at low cost. Further, by integrally forming the blocking portion and the elastic member portion, the number of parts can be decreased and the production steps can be simplified, resulting in further reduced cost.

BRIEF DESCRIPTION OF THE DRAWINGS

FIG. 1A is an outline plan view of a multi-directional selector valve using a valve structure according to one aspect of the presently disclosed embodiment.

FIG. 1B is an outline front view of a multi-directional selector valve using a valve structure according to one aspect of the presently disclosed embodiment.

FIG. 9D is a view for explaining a motion of a multi-directional selector valve using a valve structure according to one aspect of the presently disclosed embodiment of.

DETAILED DESCRIPTION

Figure 1C:
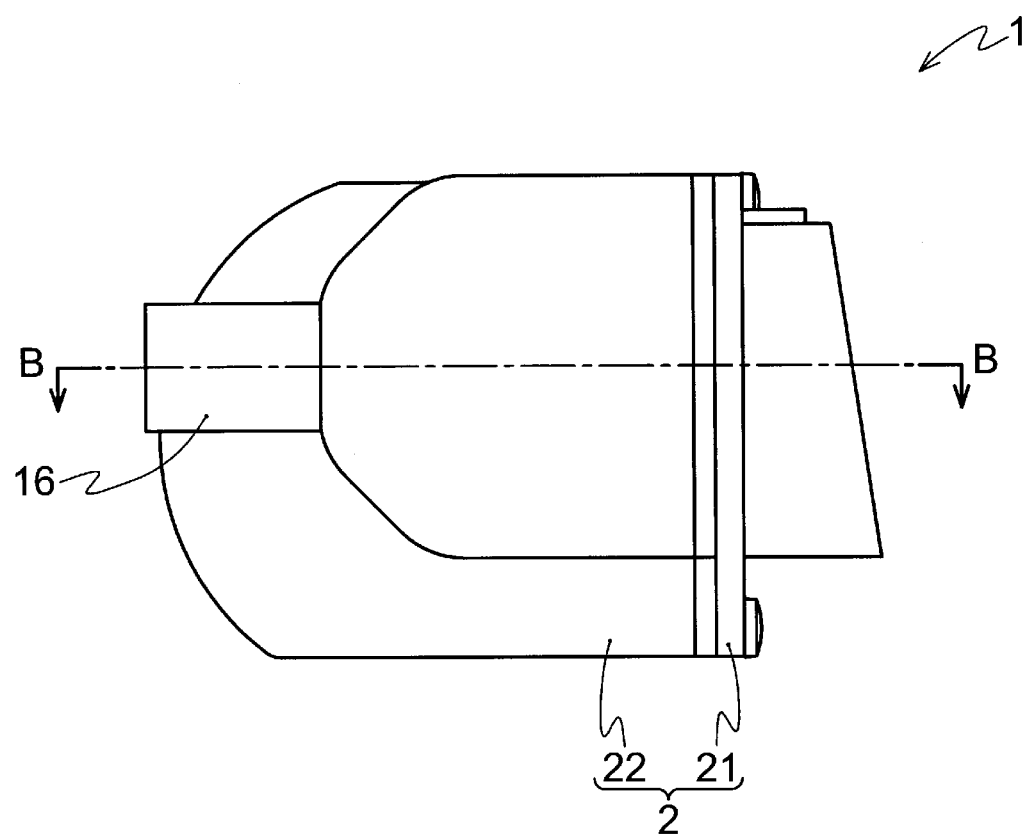
FIG. 1C is an outline right side view of a multi-directional selector valve using a valve structure according to one aspect of the presently disclosed embodiment.
Figure 2A:
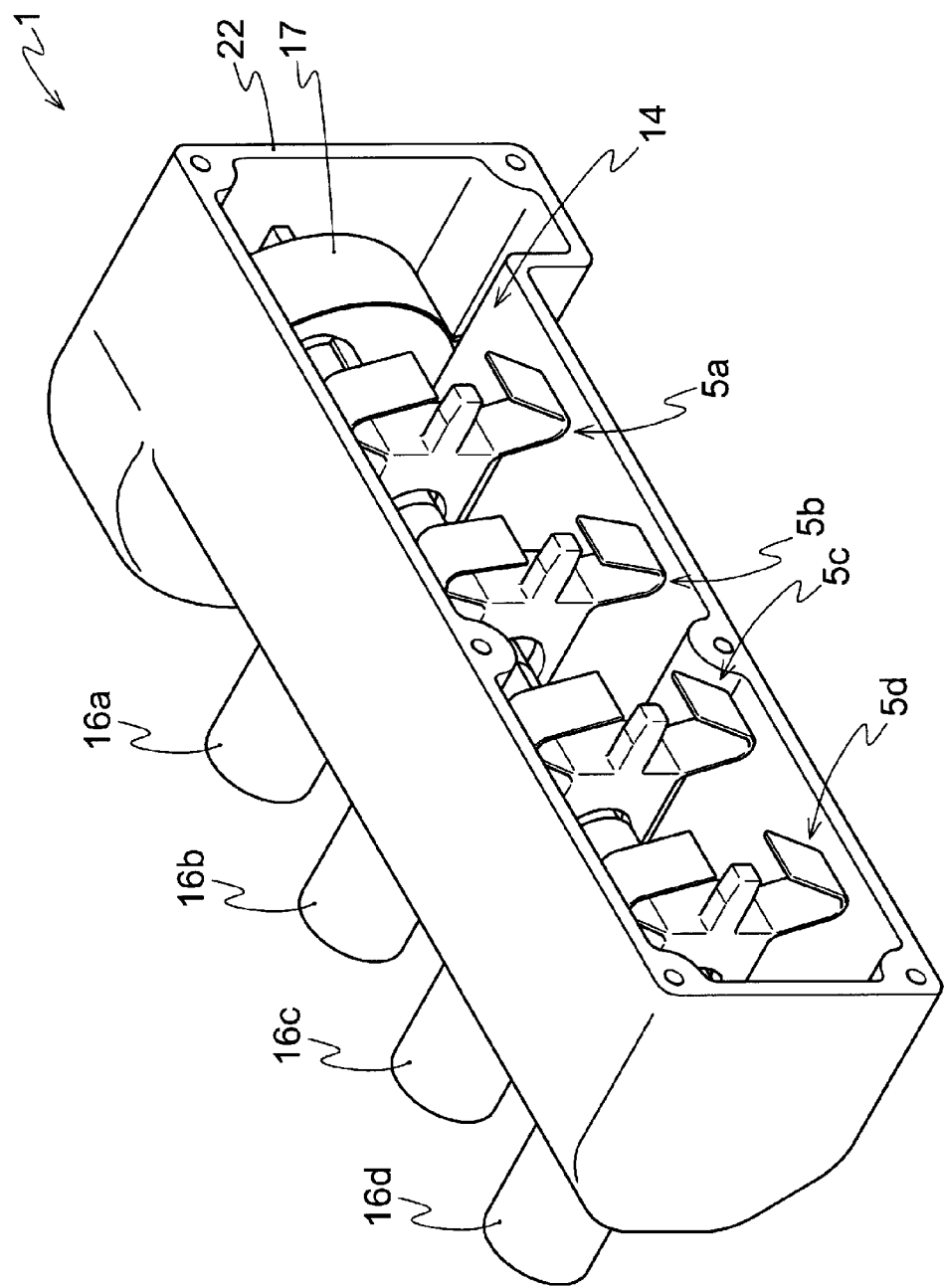
FIG. 2A is a perspective view of the valve structure of FIGS. 1A-1C from which a first housing has been removed.
Figure 2B:
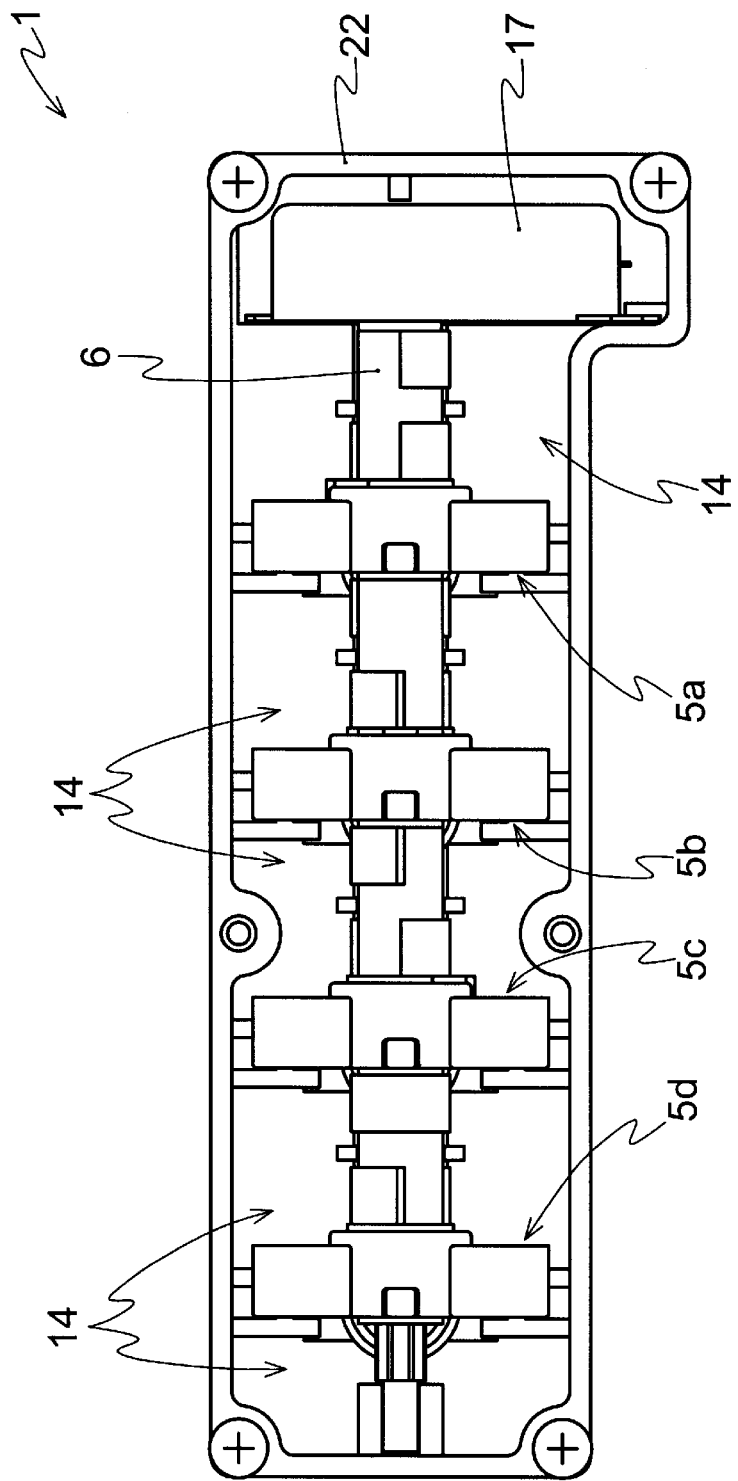
FIG. 2B is a view showing the inside of a second housing of the valve structure of FIGS. 1A-1C from which a first housing has been removed.
Figure 3A:
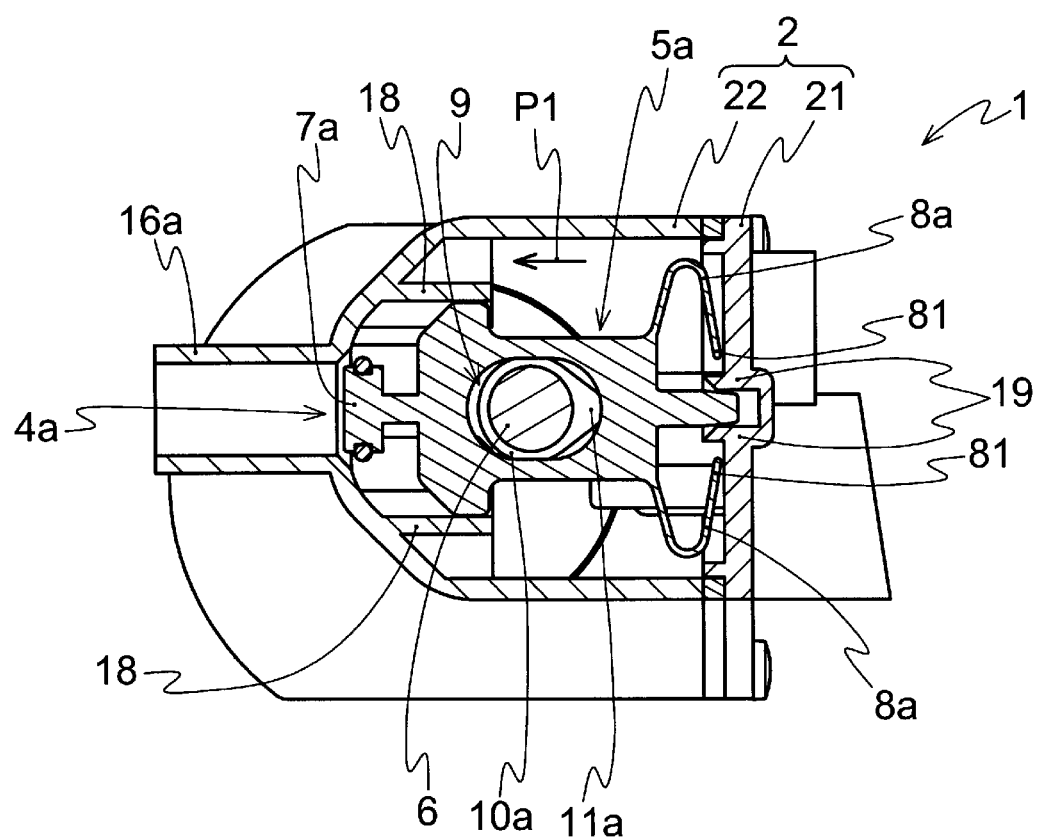
FIG. 3A is a cross-sectional view of A-A line of FIG. 1A.

Next, the valve structure according to one aspect of the presently disclosed embodiment of is explained by referring to FIGS. 1A to 1C, 2A, 2B, 3A and 3B. The valve structure according to this aspect of the presently disclosed embodiment is configured so as to comprise a valve case 2 provided with a suction port 3 into which a fluid flows and discharge ports 4a-4d from which the fluid flows out, valve bodies 5a-5d provided for opening and closing the discharge ports 4a-4d and a cam shaft 6 which is a drive body provided for driving the valve bodies 5a-5d. As shown in FIG. 3A, the valve body 5a is provided with a blocking portion 7a disposed opposite to the discharge port 4a for closing the discharge port 4a at one end on the left-hand side in FIG. 3A and a pair of plate springs 8a, which is an elastic member portion generating an elastic force for moving the blocking portion 7a for opening or closing the discharge port 4a and is provided at the other end on the right-hand side in FIG. 3A. End portions 81 of the pair of plate springs 8a located opposite to the blocking portion 7a are supported by the inner wall of the valve case 2 facing the discharge port 4a. Further, on the valve body 5a, a through-hole 9 penetrating the valve body 5a in a direction (of arrangement of the plurality of valve bodies 5a-5d and) intersecting the moving direction (the direction shown by an arrow P1 in FIG. 3A) of the blocking portion 7a moved by the elastic force of the plate springs 8a is provided. A cam shaft 6 formed into a rod-like shape is provided with a plate cam 10a, and a top portion 11a of the plate cam 10a forms a convex portion on the side of the cam shaft 6. In this aspect of the presently disclosed embodiment, the cam shaft 6 is inserted into the through-holes of the four valve bodies 5a-5d. In this aspect of the presently disclosed embodiment, as mentioned later, the opening and the closing of the four discharge ports 4a-4d are controlled by pressing the top portions 11a-11d of the plate cams 10a to 10d onto the valve bodies 5a-5d by rotating the cam shaft 6 and thus moving the blocking portions 7a-7d in the direction intersecting the cam shaft 6. In addition, in this aspect of the presently disclosed embodiment, the four discharge ports 4a-4d are provided, and the corresponding four each of the valve bodies 5a-5d and the plate cams 10a-10d are provided. However, the number of them is not limited to four, and may be one or plurality other than four.

In this aspect of the presently disclosed embodiment, as shown in FIGS. 1A-1C, the valve case 2 is formed by combining a first housing 21 and a second housing 22. The first housing 21 is provided with the suction port 3 communicating with an air path 14 which is an inner space of the second housing 22 shown in FIGS. 2A and 2B, and in this aspect of the presently disclosed embodiment, in the second housing 22, four discharge pipes 16a-16d are arranged in a row and the discharge pipes 16a-16d are communicated with the air path 14 via the discharge ports 4a-4d. Air from the suction port 3 circulates in the air path 14 and is discharged from any of the discharge ports 4a-4d which is not closed by the blocking portions 7a-7d of the valve bodies 5a-5d. The suction port 3 may be connected to, for example, an air pump via an air supply pipe, and the discharge ports 4a-4d may be connected to, for example, a plurality of septic tanks via the discharge pipes 16a-16d, respectively. The material of the valve case 2 is not limited particularly, and metal, plastic or the like may be used therefor.

Figure 3B:
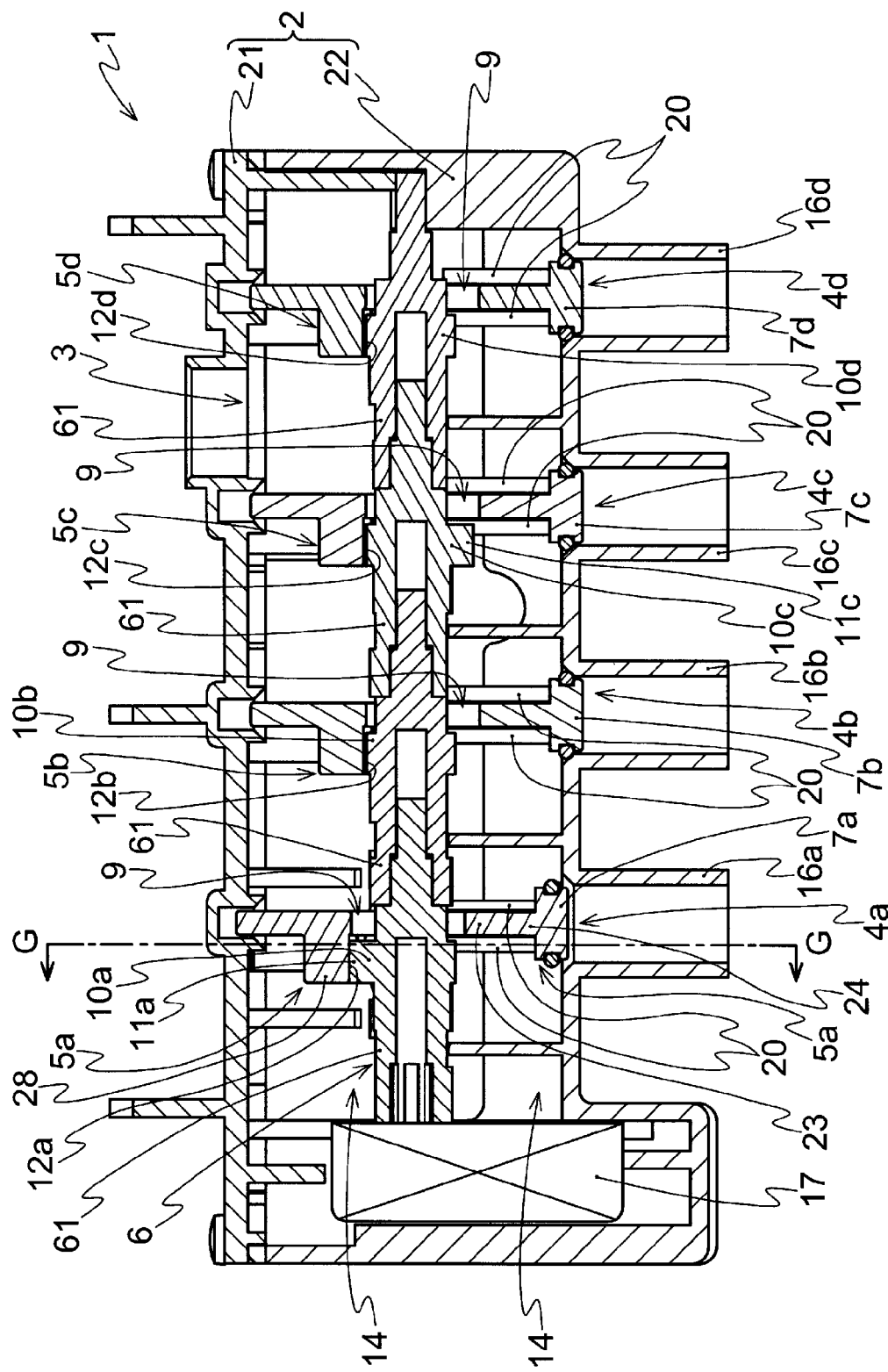
FIG. 3B is a cross-sectional view of B-B line of FIG. 1C.
Figure 4A:
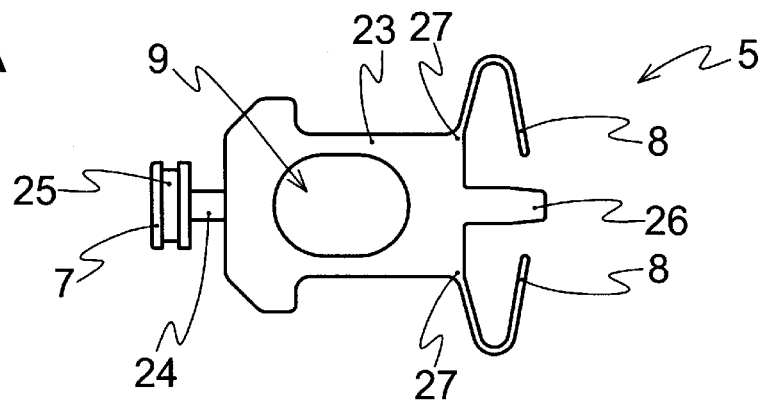
FIG. 4A is a view for explaining a valve body according to one aspect of the presently disclosed embodiment.
Figure 4B:
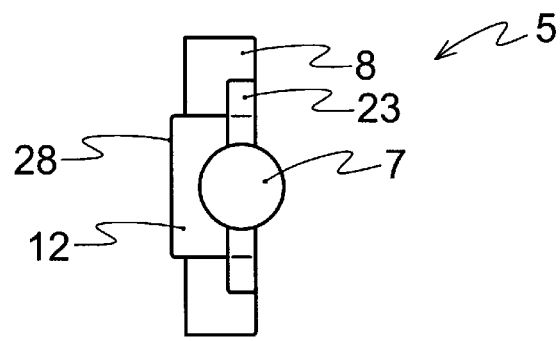
FIG. 4B is a view for explaining a valve body according to one aspect of the presently disclosed embodiment.
Figure 4C:
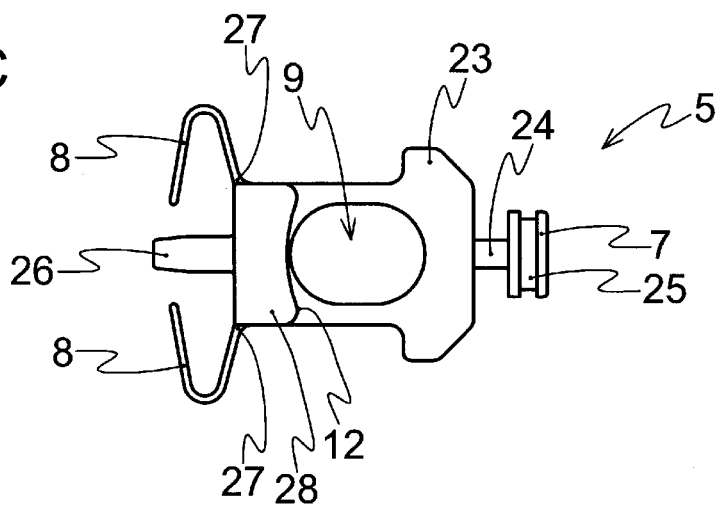
FIG. 4C is a view for explaining a valve body according to one aspect of the presently disclosed embodiment.
Figure 4D:
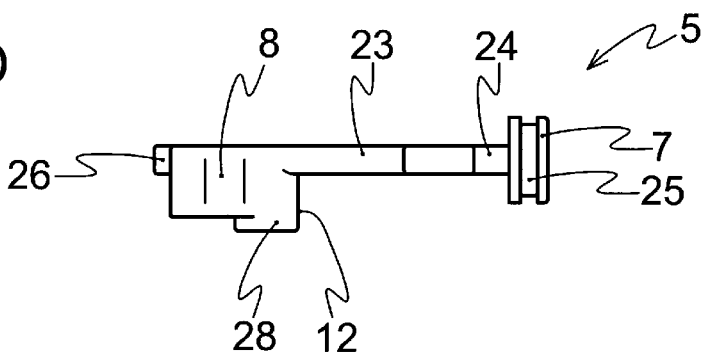
FIG. 4D is a view for explaining a valve body according to one aspect of the presently disclosed embodiment.

In this aspect of the presently disclosed embodiment, as shown in FIGS. 2A, 2B and 3B, the four valve bodies 5a-5d, the cam shaft 6 inserted into the through-holes 9 of these four valve bodies 5a-5d and the drive source 17 being connected to the cam shaft 6 and driving the rotation of the cam shaft 6 are disposed in the air path 14.

The valve bodies 5a-5d are designed so that the vertical direction thereof is guided by the guide portions 18 and 19 along the moving direction P1 of the valve bodies 5a-5d as shown in FIG. 3A, and the axial direction of the cam shaft 6 (a thickness direction of a plate-like main body portion 23 explained later) is guided by the guiding portions 20 as shown in FIG. 3B. The blocking portions 7a-7d provided at one end each of the valve bodies 5a-5d are located so as to face the discharge ports 4a-4d, respectively. In this aspect of the presently disclosed embodiment, the plate springs 8a-8d provided at the other end side of the valve bodies 5a-5d are disposed so that when the first housing 21 is combined with the second housing 22, the end portions 81 opposite to the blocking portions 7a-7d are pressed onto the inner wall of the first housing 21 and are in a compressed state. Therefore, the plate springs 8a-8d always generate an elastic force for returning to an equilibrium state and are always biasing the blocking portions 7a-7d toward the discharge ports 4a-4d side. FIG. 3A shows that the valve body 5a is pressed toward the right hand direction in FIG. 3A by means of the top portion 11a of the plate cam 10a, the plate spring 8a is further compressed and the discharge port 4a is in an opened state.

As shown in FIG. 3B, the valve bodies 5a-5d are disposed in a position where at least a part of wall surfaces 12a-12d provided on the valve bodies 5a-5d face the four plate cams 10a-10d provided on the cam shaft 6 in the axial direction of the cam shaft 6 and at a part of a circumferential direction of the cam shaft 6. By disposing the valve bodies 5a-5d in such a position, it is possible that the top portions 11a-11d of the plate cams 10a-10d are pressed onto the wall surfaces 12a-12d by the rotation of the cam shaft 6, and the blocking portions 7a-7d are moved in the direction intersecting the cam shaft 6, thereby enabling the discharge ports 4a-4d to be opened. FIG. 3B shows that the top portion 11a of only the plate cam 10a located at the leftmost side is in a state of being pressed onto the wall surface 12a provided on the valve body 5a. Therefore, in FIG. 3B, only the discharge port 4a located opposite to the blocking portion 7a provided on the valve body 5a is in an opened state, and the other discharge ports 4b-4d are in a closed state. In addition, in FIG. 3B, the top portion 11c of the plate cam 10c combined with the valve body 5c is shown in a state of facing the discharge port 4c side, and the top portions of the plate cams 10b and 10d face in a vertical direction with respect to the cross-section shown in FIG. 3B, and therefore are not shown.

FIGS. 4A-4D represent outlines of the front view, left side view, rear view and plan view of the valve body 5 of one aspect of the presently disclosed embodiment. The valve body 5 is provided with a plate-like main body portion 23, the blocking portion 7 formed into a disk-like shape and provided at one end of the main body portion 23 and the pair of plate springs 8 at the other end of the main body portion 23. The main body portion 23 is provided with a through-hole 9 for inserting the cam shaft 6 thereinto. The through-hole 9 is formed into a long hole at least having a length for a stroke of the valve body 5 along the moving direction of the valve body 5 at around the center of the main body portion 23 so that the valve body 5 can move regarding the cam shaft 6 in the direction intersecting the axial direction of the cam shaft 6. The respective one ends of the pair of plate springs 8 are jointed to the end of the plate-like main body portion 23 at the other end side, and the main body portion 23 and the blocking portion 7 are connected by means of a connection portion 24 having a width nearly equal to the thickness of the main body portion 23. On the side periphery of the blocking portion 7, a groove 25 for fitting an O-ring thereto is provided. On the other end side of the main body portion 23, a guided portion 26 which is guided by the guide portions 19 of the first housing 21 (See FIG. 3A) and protrudes toward the moving direction of the valve body 5 from the other end side of the main body portion 23 is provided.

The plate springs 8 are formed so as to have a cross-section in the doglegged form as if a rectangular thin plate is bent around the center in its lengthwise direction. The thickness of the plate spring 8 and the shape of the bent portion thereof are not limited particularly, and it is preferable that the bent portion is formed at a curvature radius of 2 to 5 mm at an angle of 30° to 50° in a state of a force not being applied to the plate springs 8 since the discharge ports 4a-4d can be properly opened or closed by the blocking portion 7 of the valve body 5. Each one end of the plate springs 8 is jointed to ends 27 of the upper and lower two sides at the other end side of the main body portion 23 in FIG. 4A.

On the main body portion 23, a thick portion 28 for forming a wall surface 12 onto which the top portions 11a-11d of the plate cams 10a-10d are pressed is formed between the end of the other end side and the periphery of the through-hole 9 at the other end side. The thick portion 28 protrudes toward the axial direction of the cam shaft 6 from the surface of the thin plate-like main body portion 23 and is formed thick. The thick portion 28 is formed such that the wall surface 12 at least has a portion directed toward the same direction as the moving direction of the biased blocking portion 7 or directed toward a direction at a sharp angle to this moving direction so that when the thick portion 28 is pressed by the top portions 11a-11d of the plate cams 10a-10d, the blocking portion 7 is moved in the direction reverse to the moving direction of the blocking portion 7 biased by the elastic force generated by the plate spring 8.

In this aspect of the presently disclosed embodiment, the through-hole 9 is formed into the long hole, but is not limited to this shape as far as it has a shape and size being sufficient for enabling a drive body such as the cam shaft 6 to be inserted thereinto. Further, in this aspect of the presently disclosed embodiment, the through-hole 9 is formed so as to penetrate the main body portion 23 in the direction being orthogonal to the flat plane of the thin plate-like main body portion 23, but this aspect of the presently disclosed embodiment is not limited to this, and the through-hole 9 may be formed so as to penetrate the main body portion 23 in the direction intersecting the moving direction of the blocking portion 7 moved by the elastic force generated by the plate spring 8.

In this aspect of the presently disclosed embodiment, since the blocking portion 7, the plate springs 8, the connection portion 24 and the main body portion 23 are integrally formed, the number of component parts can be decreased and the production can be done easily, which makes it possible to reduce cost. However, the valve body 5 may be formed by forming the blocking portion 7 and the plate springs 8 separately and then combining them. The material of the valve body 5 is not limited particularly as far as a sealing property of the blocking portion 7 and a desired elasticity of the plate springs 8 can be obtained, and metal, a resin such as a plastic and a combination thereof can be used.

Figure 10:
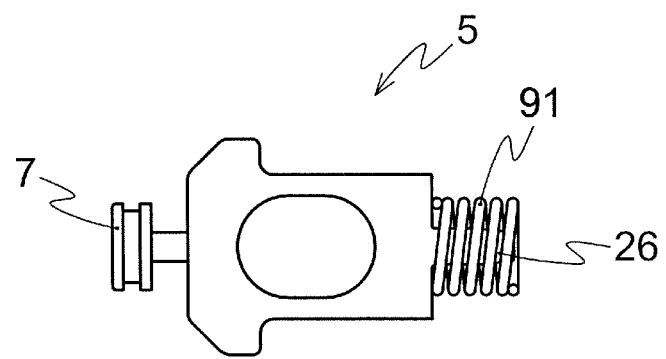
FIG. 10 is a view for explaining other aspects of the presently disclosed embodiment using a coil spring as the elastic member portion of the valve body.
Figure 11:
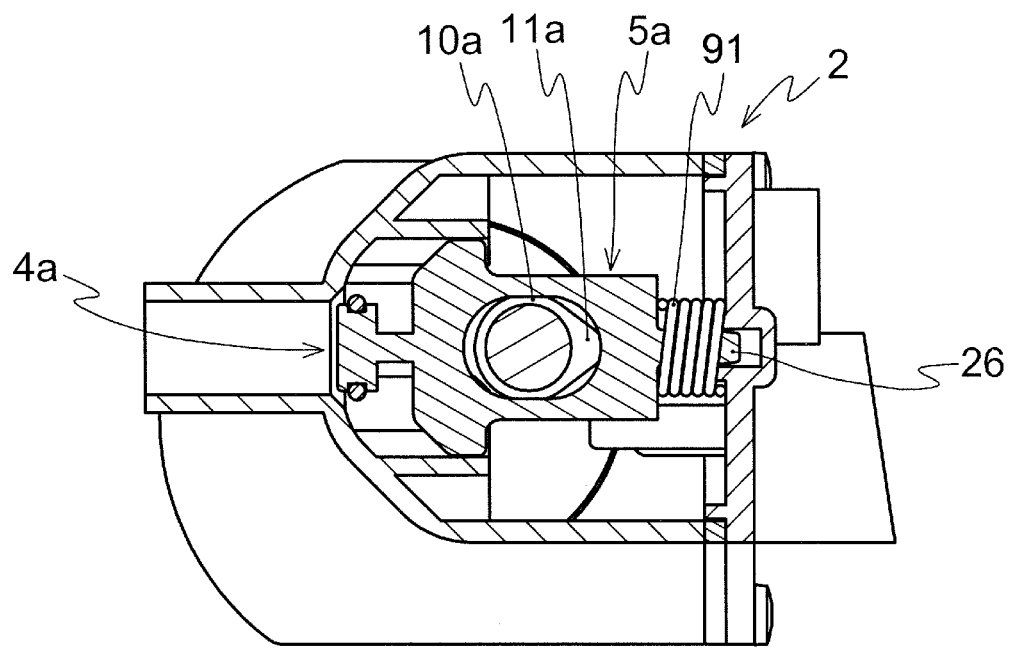
FIG. 11 is a cross-sectional view of A-A line of FIG. 1A when using a coil spring as the elastic member portion.
Figure 12:
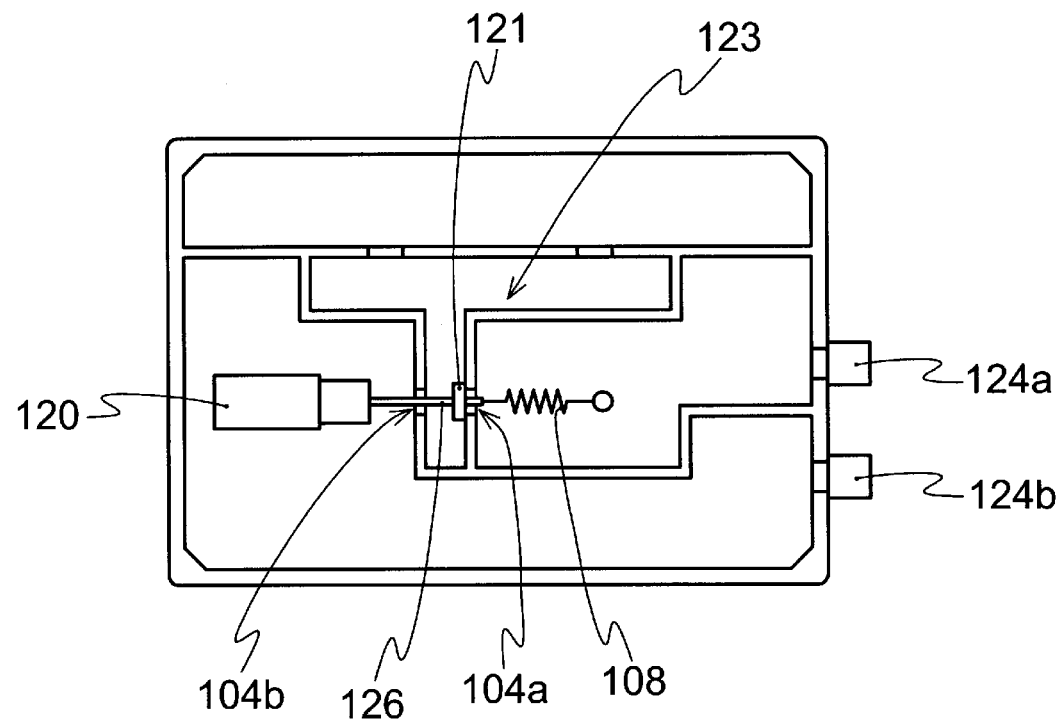
FIG. 12 illustrates an example of a conventional valve structure.
Figure 13A:
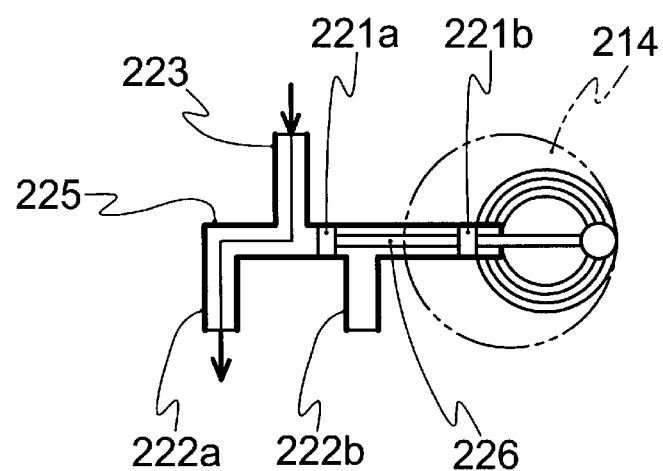
FIG. 13A illustrates other examples of a conventional valve structure.
Figure 13B:
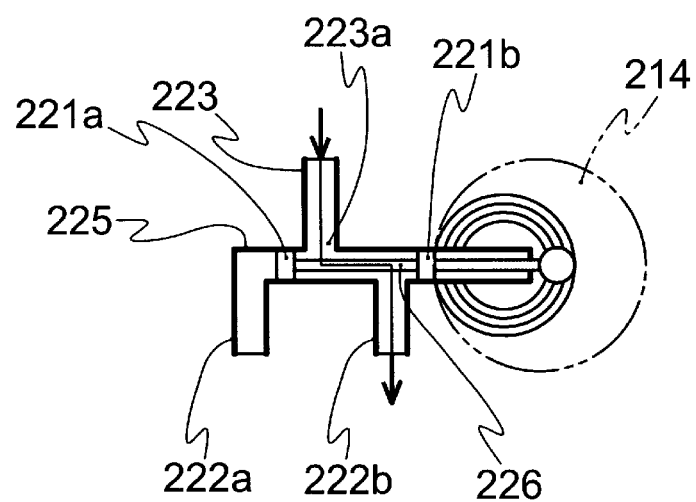
FIG. 13B illustrates other examples of a conventional valve structure.
Figure 14A:
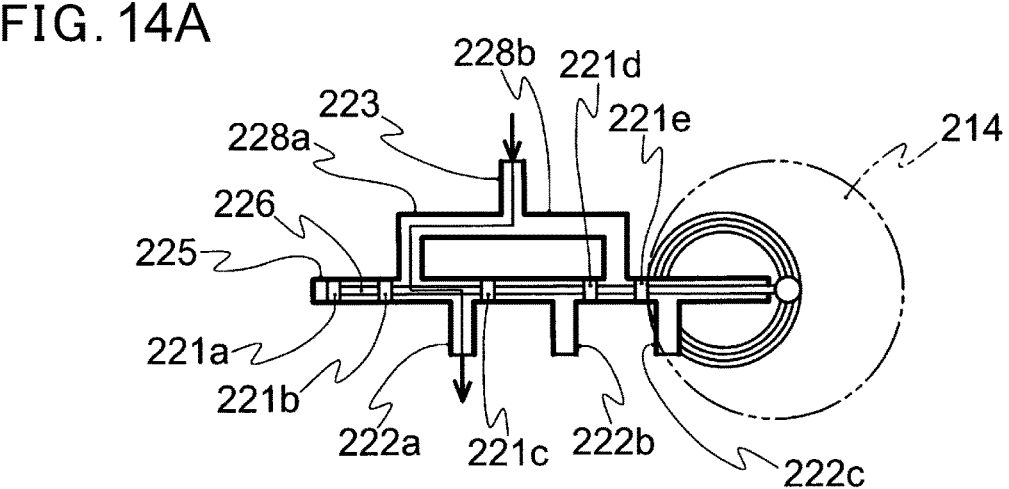
FIG. 14A illustrates other aspects of the presently disclosed embodiment of the other examples of a conventional valve structure.
Figure 14B:
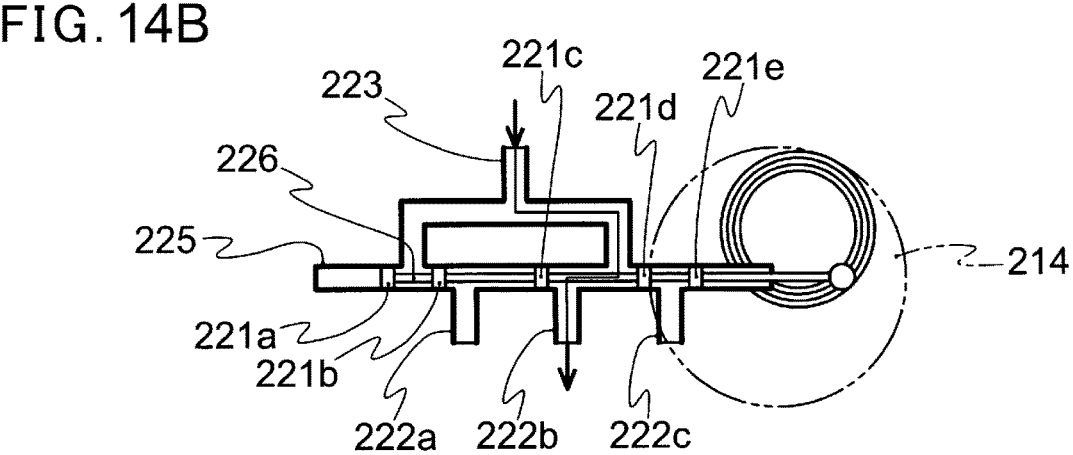
FIG. 14B illustrates other aspects of the presently disclosed embodiment of the other examples of a conventional valve structure.
Figure 14C:
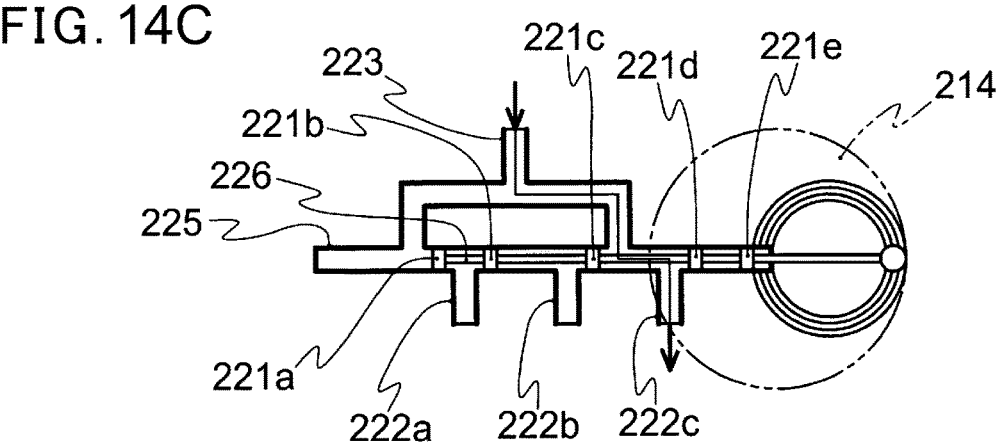
FIG. 14C illustrates other aspects of the presently disclosed embodiment of the other examples of a conventional valve structure.

This aspect of the presently disclosed embodiment was explained by means of an example using the plate springs 8 as the elastic member portion. However, kind of the elastic member of the elastic member portion is not limited particularly as far as it can bias the blocking portion 7 of the valve body 5 toward the discharge ports 4a-4d. For example, as shown in FIGS. 10 and 11, coil spring 91 may be used as the elastic member portion. One end of the coil spring 91 is supported on the inner wall of the valve case, and the other end thereof is supported on the other end side of the valve body 5. The coil spring 91 and the valve body 5 may be formed integrally, or may be formed as separate members. In this aspect of the presently disclosed embodiment, the coil spring 91 is, as shown in FIGS. 10 and 11, arranged around the guided portion 26 formed at the other end side of the valve body 5. FIG. 11 shows that the valve body 5a is pressed toward the right direction in FIG. 11 by the top portion 11a of the plate cam 10a, the coil spring is further compressed and the discharge port 4a is in an opened state. When the coil spring 91 is used as the elastic member portion, the configuration of the valve body 5 and the valve case 2 may be the same as that in the case of using the plate spring 8. The coil spring 91 shown in the drawings are provided at the other end side of the valve body 5, but its position is not limited particularly as far as it can bias the blocking portion 7 of the valve body 5 toward the discharge ports 4a-4d. The same thing can be said also with respect to the case of using the plate spring 8.

Figure 5A:
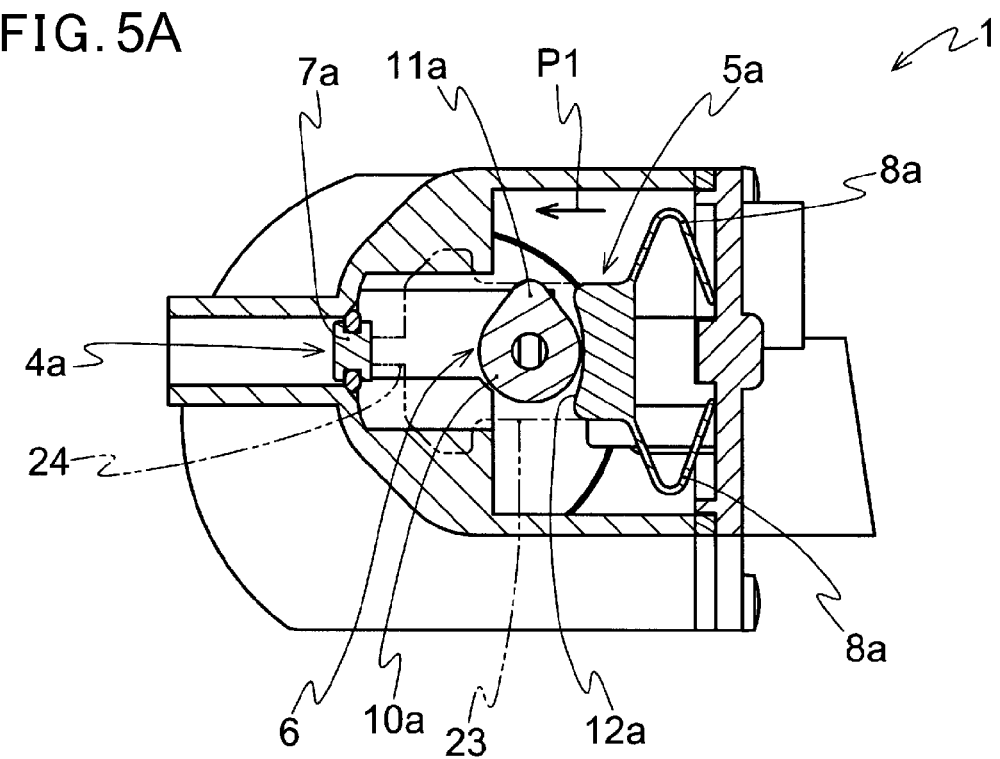
FIG. 5A is a cross-sectional view of C-C line of FIG. 1A for explaining a motion of a valve body according to one aspect of the presently disclosed embodiment.
Figure 5B:
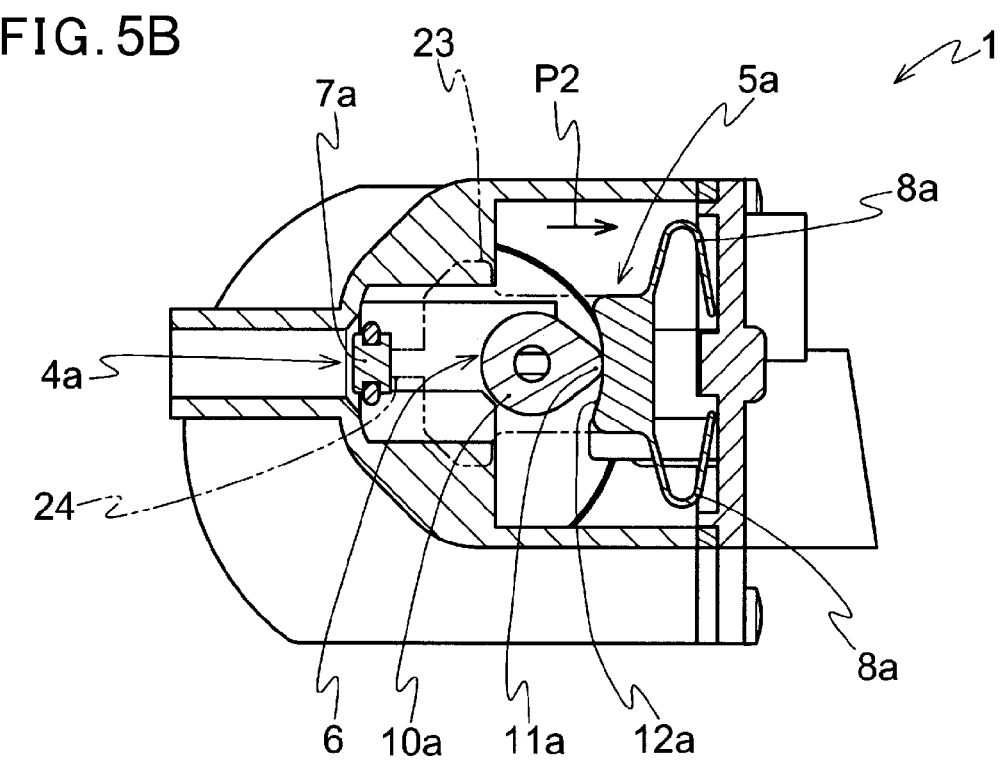
FIG. 5B is a cross-sectional view of C-C line of FIG. 1A for explaining a motion of a valve body according to one aspect of the presently disclosed embodiment.

Next, operation of the valve bodies 5a to 5d for opening and closing the discharge ports 4a-4d in the valve structure of this aspect of the presently disclosed embodiment is explained below by referring to FIGS. 5A and 5B. The following explanation is made with respect to the case of using the plate spring 8. Operation of the valve bodies 5a to 5d using the coil spring 91 is the same as in the case of using the plate spring 8, and therefore, explanation thereof is omitted. FIGS. 5A and 5B show a cross-sectional view of C-C line of FIG. 1A. FIG. 5A shows the discharge port 4a being in a closed state, and FIG. 5B shows the discharge port 4a being in an opened state. The position of the C-C cross-section of FIG. 1A corresponds to the position shown by the G-G line in FIG. 3B, and since the G-G line is not located on the main body portion 23 other than the thick portion 28 and the connection portion 24, the profiles of the main body portion 23 and the connection portion 24 are represented by the two-dot chain lines in FIGS. 5A and 5B. As mentioned above, the plate springs 8a are designed so as to be normally in the compressed state and always generate an elastic force for returning to an equilibrium state. Therefore, as shown in FIG. 5A, when in FIG. 5A, the top portion 11a of the plate cam 10a faces toward the direction such as the upward, downward, or left direction as in FIG. 5A, in which it does not come into contact with the valve body 5a, the blocking portion 7a is biased toward the side shown by an arrow P1 in FIG. 5A, namely toward the discharge port 4a side, thereby closing the discharge port 4a. On the other hand, when the cam shaft 6 is driven for rotation by the drive source 17 (See FIG. 3B) to bring the valve to the state shown in FIG. 5B, namely to such a state that the top portion 11a of the plate cam 10a faces toward the right direction in FIG. 5B, the top portion 11a of the plate cam 10a is pressed onto the wall surface 12a provided on the valve body 5a, thereby moving the blocking portion 7a in the direction intersecting the cam shaft 6, i.e. in the direction shown by an arrow P2 in FIG. 5B and separating the blocking portion 7a from the discharge port 4a to open the discharge port 4a. In such a manner, the discharge port 4a can be in an opened state or in a closed state by reciprocating motion of the blocking portion 7a in the direction intersecting the cam shaft 6 which is performed by an action of the elastic force generated by the plate spring 8a and an action of pressing the top portion 11a of the plate cam 10a onto the valve body 5a by the rotation of the cam shaft 6.

Figure 6A:
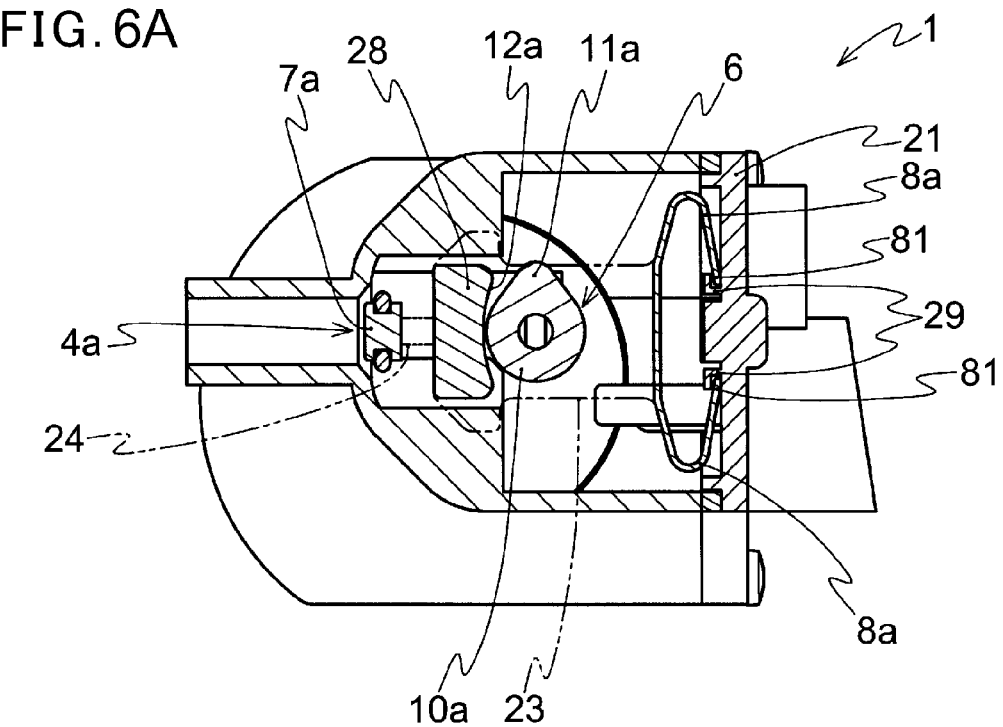
FIG. 6A is a cross-sectional view of C-C line of FIG. 1A for explaining a motion of other valve body configuration according to one aspect of the presently disclosed embodiment.
Figure 6B:
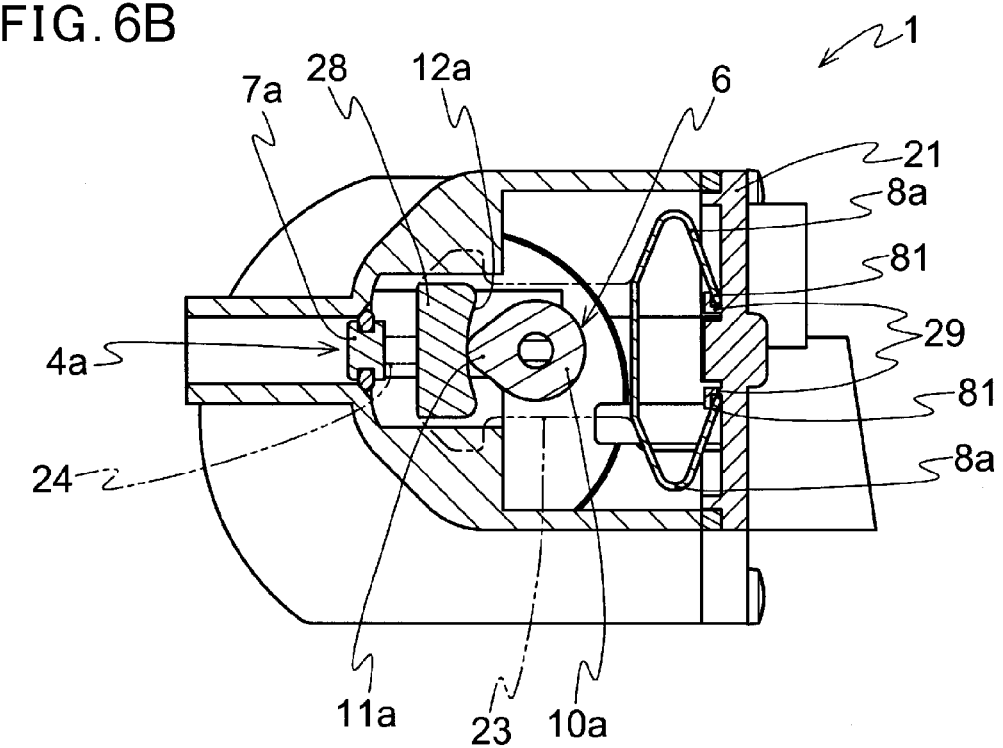
FIG. 6B is a cross-sectional view of C-C line of FIG. 1A for explaining a motion of other valve body configuration according to one aspect of the presently disclosed embodiment.

As mentioned above, this aspect of the presently disclosed embodiment is configured such that the blocking portion 7 is biased with the elastic force of the plate spring 8, thereby closing the discharge port 4, and the valve body 5 is moved toward the direction reverse to the direction of the elastic force of the plate spring 8 by means of the driving force of the drive source 17, thereby opening the discharge port 4. However, the presently disclosed embodiment is not limited to such a configuration. Example of other configuration of the valve body 5 of this aspect of the presently disclosed embodiment is explained below by referring to FIGS. 6A and 6B. FIGS. 6A and 6B show the cross-section of the C-C line of FIG. 1A. FIG. 6A shows the discharge port 4a being in an opened state, and FIG. 6B shows the discharge port 4a being in a closed state. Also in FIGS. 6A and 6B, the profiles of the main body portion 23 and the connection portion 24 of the valve body 5a are represented by the two-dot chain lines in the same manner as in FIGS. 5A and 5B. In this configuration, as shown in FIGS. 6A and 6B, the thick portion 28 forming the wall surface 12a is provided in a region of the valve body 5a located near the blocking portion 7a side rather than the cam shaft 6 inserted into the valve body 5a. Further, the end portions 81 of the pair of plate springs 8a located opposite to the blocking portion 7a are inserted between the inner wall of the first housing 21 and hook portion 29 having an L-shape in its cross section and being located on the inner wall of the first housing 21, thereby restricting the movement of the whole plate spring 8a toward the blocking portion 7a side. In this configuration, the shape of the plate spring 8a and the dimensions of other parts of the valve body 5a are designed so that in a state that the top portion 11a of the plate cam 10a is not pressed onto the wall surface 12a provided on the valve body 5a as shown in FIG. 6A, the plate spring 8a is in an equilibrium state so as not to be compressed or expanded and the discharge port 4a is in an opened state. On the other hand, when the top portion 11a of the plate cam 10a faces the blocking portion 7a side and is pressed onto the wall surface 12a provided on the valve body 5a as shown in FIG. 6B, the plate spring 8a is expanded and the blocking portion 7a is moved toward the discharge port 4a side, thus closing the discharge port 4a. When the plate cam 10a is shifted by the rotation of the cam shaft 6 from the state as shown in FIG. 6B to the state that the top portion 11a of the plate cam 10a is not pressed onto the wall surface 12a provided on the valve body 5a, the blocking portion 7a is separated from the discharge port 4a by the elastic force of the plate spring 8a acting in a compressing direction, the discharge port 4a is returned to the opened state and the plate spring 8a also returns to the equilibrium state. By such configuration, since the plate spring 8a is in an equilibrium state except the case where the valve body 5a is pressed by the top portion 11a of the plate cam 10a, the life of the plate spring 8a can be extended.

Figure 7:
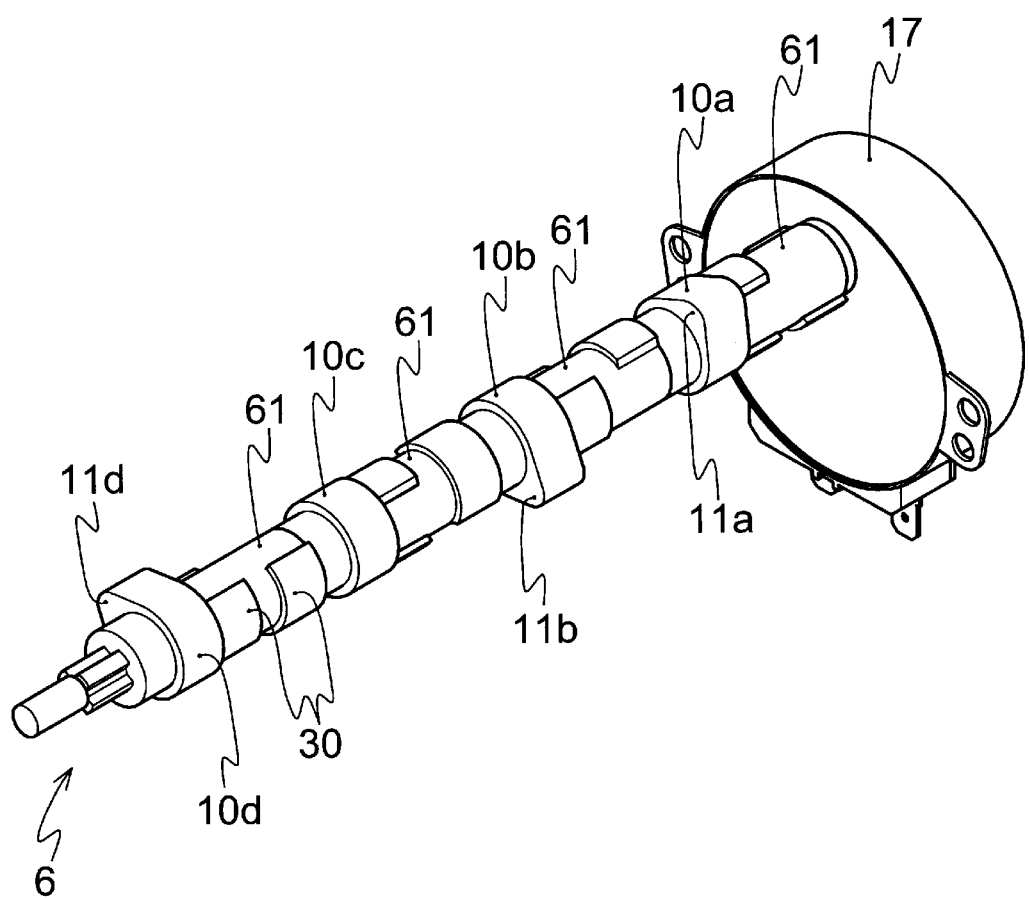
FIG. 7 is a view for explaining a drive body according to one aspect of the presently disclosed embodiment.

As shown in FIG. 7, the cam shaft 6 is formed into a rod-like shape, and in this aspect of the presently disclosed embodiment, the four plate cams 10a-10d are provided apart from each other at the same pitch as that of the discharge ports 4a-4d (See FIG. 3B). The plate cams 10a-10d are formed into a plate-like shape having the top portions 11a-11d, respectively which are protruding on a part of the outer periphery thereof, and thus the convex portions are formed on the side of the cam shaft 6 by the top portions 11a-11d of the plate cams 10a-10d.

One end of the cam shaft 6 is connected to the drive source 17, and the cam shaft 6 is driven and rotated by the drive source 17. The drive source 17 is not limited particularly as long as the cam shaft 6 can be rotated, and in order to secure a predetermined opening time of the discharge ports 4a-4d, a synchronous motor rotating at a low speed and a pulse motor rotating by a predetermined angle for each one pulse of electric power to be supplied in the form of pulse are preferred.

In this aspect of the presently disclosed embodiment, as shown in FIG. 3B and FIG. 7, the cam shaft 6 is composed of a plurality of shaft parts 61 and is formed by connecting the separate shaft parts 61 formed integrally with the respective plate cams 10a-10d in its axial direction. By such connectable configuration, when the number of branches is increased, the plate cams 10 can be increased only by further connecting additional shaft parts 61 according to the increased number of branches without producing a new cam shaft 6. The method of fixing the connection portion of the shaft part 61 is not limited particularly, and the shaft part 61 may be fixed by caulking, screwing or the like, or the shaft parts 61 may be inserted simply in order in the axial direction without fixing them and as shown in FIG. 3B, the end shaft part 61 may be provided close to the inner wall of the valve case 2, thereby preventing each shaft part 61 from falling during the use thereof. By adopting such a method being capable of separating the shaft parts 61, when the number of branches is decreased, excess shaft parts 61 can be removed and the length of the cam shaft 6 can be shortened without producing a new cam shaft 6. Further, such a method is preferable because when any of the valve bodies 5a-5d are broken, even in the case where the through-holes 9 of the valve bodies 5a-5d do not have a shape or size being capable of passing the plate cams 10a-10d thereinto, the broken valve bodies 5a-5d can be replaced by separating the shaft parts 61. However, the entire cam shaft 6 may be formed integrally, and also, the respective plate cams 10a-10d may be formed separately from the cam shaft 6 and the shaft parts 61 and then assembled with the cam shaft 6 or the shaft parts 61.

In this aspect of the presently disclosed embodiment, as shown in FIG. 7, the plate cams 10a-10d are arranged so that the respective top portions 11a-11d face toward different directions in the circumferential direction of the cam shaft 6 (different directions by an angle of every 90° in this aspect of the presently disclosed embodiment). By this configuration, a plurality of the discharge ports 4a-4d arranged in a row on one surface of the second housing 22 can be brought to an opened state separately at different time mutually by rotating the cam shaft 6. In the multi-directional selector valve using the valve structure of this aspect of the presently disclosed embodiment, switching of the discharge ports 4a-4d to an opened or closed state is then explained referring to FIGS. 8A-8D and FIGS. 9A-9D.

Figure 8A:
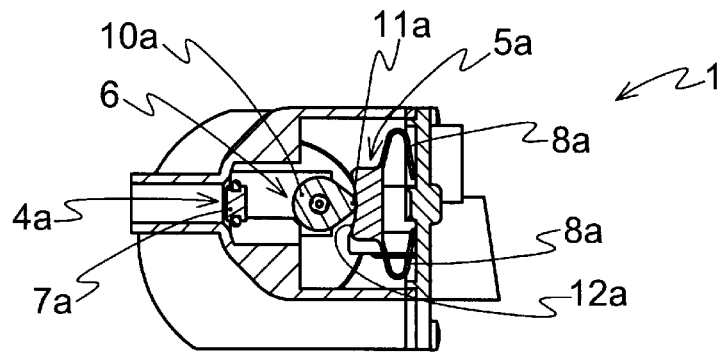
FIG. 8A is a view for explaining a motion of a multi-directional selector valve using a valve structure according to one aspect of the presently disclosed embodiment.
Figure 8B:
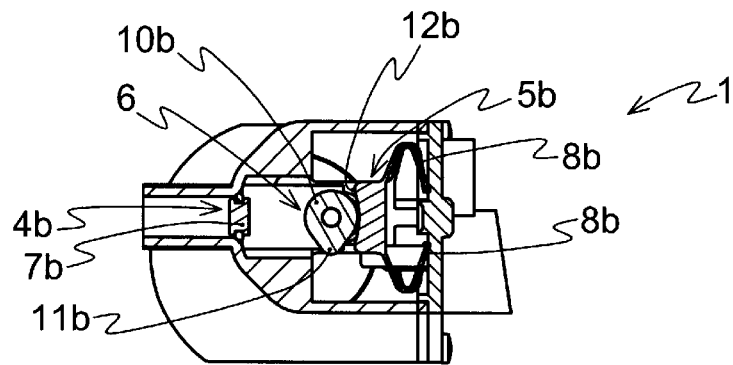
FIG. 8B is a view for explaining a motion of a multi-directional selector valve using a valve structure according to one aspect of the presently disclosed embodiment.
Figure 8C:
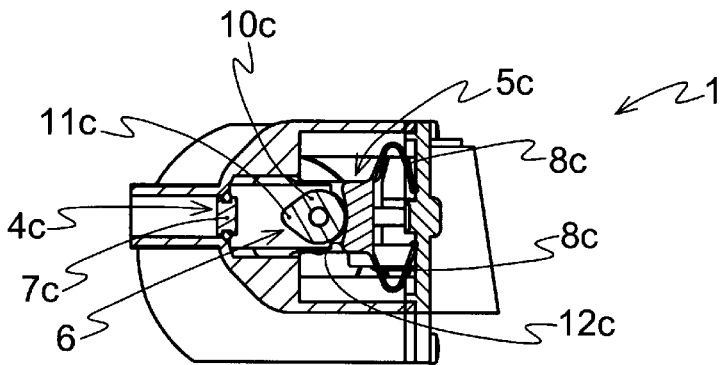
FIG. 8C is a view for explaining a motion of a multi-directional selector valve using a valve structure according to one aspect of the presently disclosed embodiment.
Figure 8D:
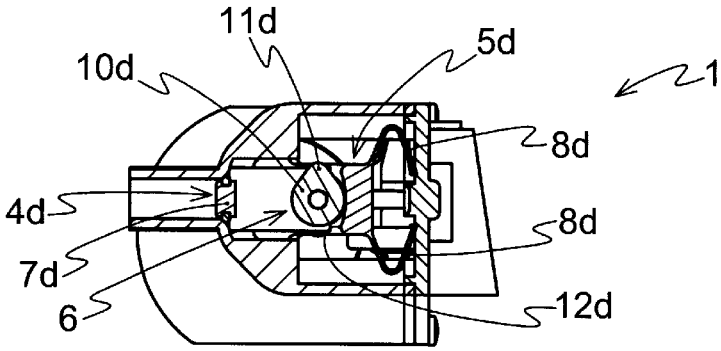
FIG. 8D is a view for explaining a motion of a multi-directional selector valve using a valve structure according to one aspect of the presently disclosed embodiment.

FIGS. 8A-8D represent C-C cross-section, D-D cross section, E-E cross section and F-F cross section, respectively of FIG. 1A. FIGS. 8A-8D show that the discharge port 4a locating on the C-C cross section of FIG. 1A is opened and the other discharge ports 4b-4d are in a closed state. Namely, as shown in FIG. 8A, the top portion 11a of the plate cam 10a is directed toward the wall surface 12a side of the valve body 5a at the right side on FIG. 8A, the valve body 5a is pressed toward the opposite side of the discharge port 4a, the blocking portion 7a is separated from the discharge port 4a, and thus the discharge port 4a is in an opened state. On the other hand, the top portions 11b-11d of the plate cams 10b-10d shown in FIGS. 8B-8D are directed toward the lower side, left side and upper side, respectively on FIGS. 8B-8D, the valve bodies 5b-5d are not pressed by the plate cams 10b-10d, and the blocking portions 7b-7d are biased by the elastic force generated by the plate springs 8b-8d to close the discharge ports 4b-4d.

Figure 9A:
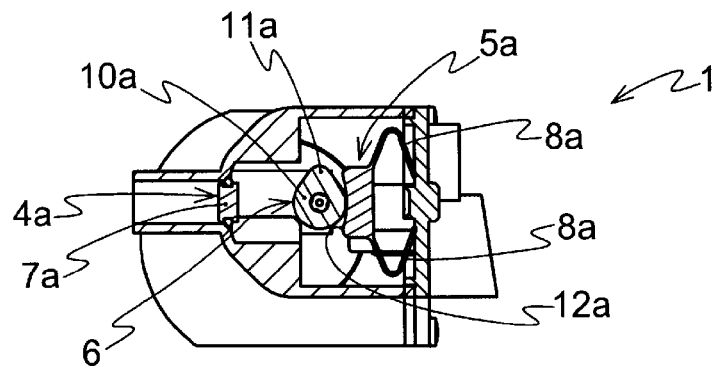
FIG. 9A is a view for explaining a motion of a multi-directional selector valve using a valve structure according to one aspect of the presently disclosed embodiment.
Figure 9B:
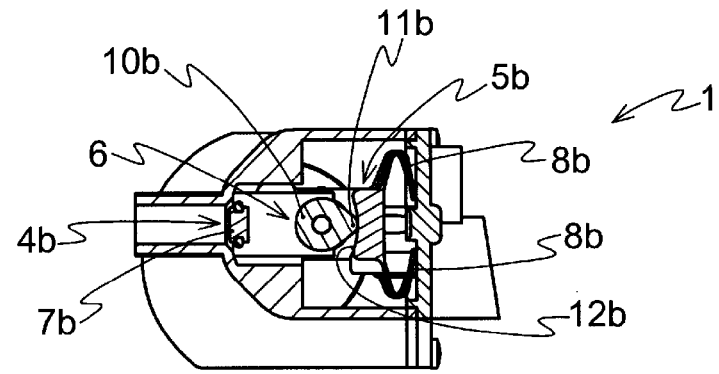
FIG. 9B is a view for explaining a motion of a multi-directional selector valve using a valve structure according to one aspect of the presently disclosed embodiment.
Figure 9C:
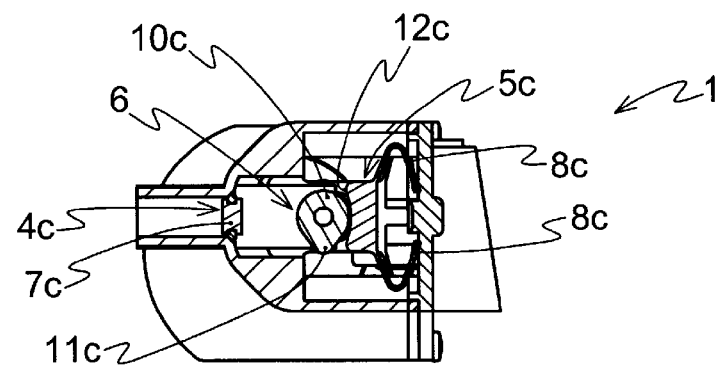
FIG. 9C is a view for explaining a motion of a multi-directional selector valve using a valve structure according to one aspect of the presently disclosed embodiment.
Figure 9D:
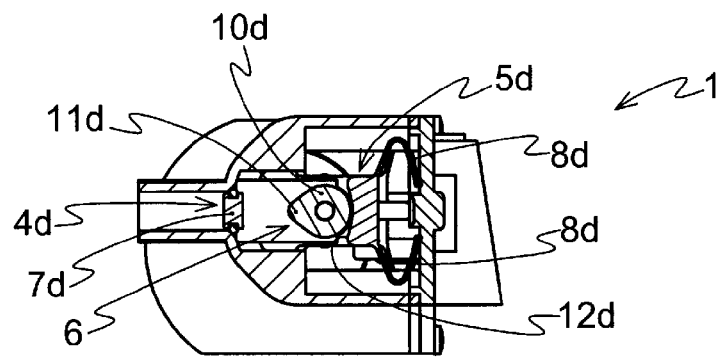

FIGS. 9A-9D show the state of the cam shaft 6 of FIGS. 8A-8D having been rotated counter-clockwise by an angle of 90° each, and FIGS. 9A-9D represent C-C cross-section, D-D cross section, E-E cross section and F-F cross section, respectively of FIG. 1A in the same manner as in FIGS. 8A-8D. In the state shown in FIGS. 9A-9D, the top portion 11b of the plate cam 10b shown in FIG. 9B is directed toward the wall surface 12b side of the valve body 5b, the valve body 5b is pressed toward the opposite side of the discharge port 4b, the blocking portion 7b is separated from the discharge port 4b, and thus the discharge port 4b is in an opened state. On the other hand, the top portions 11a, 11c and 11d of the plate cams 10a, 10c and 10d shown in FIGS. 9A, 9C and 9D are directed toward the upper side, lower side and left side, respectively on FIGS. 9A, 9C and 9D, the valve bodies 5a, 5c and 5d are not pressed by the plate cams 10a, 10c and 10d, and the blocking portions 7a, 7c and 7d are biased by the elastic force generated by the plate springs 8a, 8c and 8d to close the discharge ports 4a, 4c and 4d.

Then, in FIGS. 9A-9D, by rotating the cam shaft 6 counter-clockwise by an angle of every 90°, the opening of the discharge ports is changed to the discharge ports 4c and then 4d in order and the other discharge ports are closed. In this aspect of the presently disclosed embodiment, as mentioned above, the plate cams 10a-10d are arranged so that the directions of the respective top portions 11a-11d differ by an angle of every 90° in the circumferential direction of the cam shaft 6. However, the arrangement of the plate cams is not limited to such configuration, and the angle may be one other than 90° or a part or the whole of the top portions 11a-11d of the plate cams 10a-10d may be configured so as to be directed in the same direction.

The multi-directional selector valve using the valve structure of this aspect of the presently disclosed embodiment can be produced easily. First, one shaft part 61 is mounted on the drive source 17, and this shaft part 61 is inserted into the through-hole 9 of the valve body 5a. Thereafter, connection of the shaft parts 61 to be added with the inserted shaft part and insertion of the connected shaft parts 61 into the valve bodies 5b-5d are repeated alternately. Next, the connected set of the assembled shaft parts 61, namely the cam shaft 6 and the valve bodies 5a-5d as well as the drive source 17 are set on the second housing 22 while guiding the peripheries of the valve bodies 5a-5d by means of the guide portions 18 (See FIG. 3A) and the guide portions 20 (See FIG. 3B) provided on the second housing 22, and then the drive source 17 is fixed to the second housing 22 by means of screws or the like. Then, by fixing the first housing 21 to the second housing 22 by means of screws or the like, the multi-directional selector valve using the valve structure of this aspect of the presently disclosed embodiment can be completed. In addition, as mentioned above, only by fixing the first housing 21 to the second housing 22, the plate springs 8a-8d are compressed, thereby generating the elastic force which biases the blocking portions 7a-7d continually toward the discharge ports 4a-4d side to enable the discharge ports 4a-4d to be in a closed state.

As mentioned above, according to the presently disclosed embodiment, the blocking portion for closing the discharge port is provided at one end of the valve body, the elastic member portion which generates an elastic force for moving the blocking portion is provided at the other end thereof, and further, the drive body having a convex portion on its side is inserted into the through-hole provided on the valve body in the direction intersecting the direction of movement of the blocking portion moved by the elastic force of the elastic member portion. Therefore, the blocking portion can undergoes a reciprocating motion in the direction intersecting the drive body by an action caused by the elastic force generated by the elastic member portion and an action of the convex portion for pressing the valve body by the rotation of the drive body. Accordingly, by inserting the drive body into the through-holes of the plural valve bodies, plural blocking portions can be moved only by one drive source, and for example, plural discharge ports arranged along the drive body can be in an opened or closed state. Thus, the cost for providing the valve bodies for the respective discharge ports can be reduced more as compared with that of prior art. Similarly even in the case where there are many discharge ports, a fluid can be distributed to many discharge ports by increasing the number of valve bodies and convex portions provided on the drive body without incurring increase in cost and size. Further, since the blocking portion and the elastic member portion need not be assembled with the discharge port being provided between them, the valve can be produced at low cost, and further cost reduction can be achieved by integrally forming the blocking portion and the elastic member portion for decrease in the number of parts and simplification of production steps.

EXPLANATION OF SYMBOLS

1 Multi-directional selector valve
2 Valve case
3 Suction port
4 (4a-4d) Discharge ports
5 (5a-5d) Valve bodies
6 Cam shaft
7 (7a-7d) Blocking portions
8 (8a-8d) Plate springs
9 Through-hole
10 (10a-10d) Plate cams
11 (11a-11d) Top portions of plate cams
12 (12a-12d) Wall surfaces
14 Air path
16 (16a-16d) Discharge pipes
17 Drive source
21 First housing
22 Second housing
28 Thick portion
61 Shaft parts
91 Coil spring

What is claimed is:

1. A valve structure comprising a valve case provided with a suction port into which a fluid flows and a discharge port from which the fluid flows out, a valve body provided for opening and closing the discharge port and a drive body provided for driving the valve body, wherein:
the valve body is provided with, at one end thereof, a blocking portion disposed so as to face the discharge port for closing the discharge port and at the other end thereof, an elastic member portion which is supported on an inner wall of the valve case facing the discharge port and generates an elastic force for moving the blocking portion so as to open or close the discharge port and the valve body further comprises a main body portion provided with a through-hole penetrating the valve body in a direction intersecting a moving direction of the blocking portion moved by the elastic force;
the blocking portion and the main body portion are formed integrally;
the drive body is formed into a rod-like shape having a convex portion on its side and is inserted into the through-hole of the valve body;
the valve body and the drive body are disposed in a path of the fluid which communicates with the suction port and the discharge port; and
the convex portion is pressed onto the valve body by the rotation of the drive body, thereby moving the blocking portion in the moving direction intersecting the drive body to control the opening and closing of the discharge port.

2. The valve structure of claim 1, wherein the valve body is provided with the blocking portion and the elastic member portion which are formed integrally.

3. The valve structure of claim 1, wherein the elastic member portion is configured so as to generate an elastic force for moving the blocking portion to close the discharge port, and
the blocking portion is configured so as to separate from the discharge port by pressing the convex portion onto the valve body, thereby opening the discharge port.

4. The valve structure of claim 1, wherein a wall surface at least having a portion facing toward the same direction as the moving direction of the blocking portion moved by the elastic force or facing toward a direction at a sharp angle to the moving direction is formed on a part of the valve body, and a plate cam in the form of a plate has a top portion protruding on its outer periphery and the top portion is provided as the convex portion of the drive body, and is pressed onto the wall surface at a predetermined rotation angle of the drive body.

5. The valve structure of claim 1, wherein the elastic member portion includes a pair of plate springs having a cross-section in a doglegged form, and ends of the pair of plate springs opposite the blocking portion is supported on the inner wall of the valve case.

6. The valve structure of claim 1, wherein the elastic member portion includes a coil spring, and one end of the coil spring is supported on the inner wall of the valve case and the other end of the coil spring is supported on another end of the valve body opposite the one end of the valve body.

7. The valve structure of claim 1, which is used on a distributing valve for distributing air supplied from an air pump into a plurality of pipes.

8. The valve structure of claim 1, wherein an air pump is connected to the suction port and the discharge port is connected to a septic tank.

9. The valve structure of claim 1, wherein the valve case further comprises guide portions which guide the valve body, and the valve body is guided by the guide portions at a part of the valve body having a length longer than a length of the blocking portion in a direction intersecting the moving direction of the blocking portion.

* * * * *